(12) United States Patent
Sinclair

(10) Patent No.: US 6,247,516 B1
(45) Date of Patent: Jun. 19, 2001

(54) TIRE CHANGING APPARATUS AND METHOD

(76) Inventor: Rick Sinclair, 496 Poplar St., Laguna Beach, CA (US) 92651

( * ) Notice: Subject to any disclaimer, the term of this patent is extended or adjusted under 35 U.S.C. 154(b) by 0 days.

(21) Appl. No.: 09/551,733

(22) Filed: Apr. 18, 2000

(51) Int. Cl.[7] .................................................. B60C 25/132
(52) U.S. Cl. ................................................ 157/1.1; 157/13
(58) Field of Search ........................... 157/1.1, 1.2, 1.28, 157/14, 11, 13

(56) References Cited

U.S. PATENT DOCUMENTS

| | | | |
|---|---|---|---|
| 1,520,599 | * 12/1924 | Robertson | 157/1.17 |
| 3,791,434 | 2/1974 | Duquesne | 157/1.24 |
| 4,012,973 | 3/1977 | Tupper | 82/82 |
| 4,230,170 | 10/1980 | Duquesne | 157/1.24 |
| 4,250,940 | 2/1981 | Curry | 157/13 |
| 4,306,607 | 12/1981 | Curry | 157/13 |
| 4,606,393 | 8/1986 | Cuccolini | 157/1.24 |
| 4,805,507 | 2/1989 | Schmidt et al. | 83/601 |
| 4,896,712 | 1/1990 | du Quesne | 157/1.24 |
| 4,986,328 | 1/1991 | Metzger | 157/1.24 |
| 5,133,236 | 7/1992 | Dudley | 83/420 |
| 5,235,888 | 8/1993 | Dom | 83/608 |
| 5,285,707 | 2/1994 | Lodovico et al. | 83/114 |
| 5,836,368 | 11/1998 | Corghi | 157/1.24 |

* cited by examiner

*Primary Examiner*—Jopseh J. Hail, III
*Assistant Examiner*—David B. Thomas
(74) *Attorney, Agent, or Firm*—James G. O'Neill

(57) ABSTRACT

An apparatus for and methods of dismounting and mounting tires onto vehicle wheels without removing the wheels from the vehicle. The apparatus includes driving elements for rotating a tire contacting the same, held in a body and operated by a power source. A pair of tire bead breakers may also be mounted in the body and operated by a power source. Tire cutting knives may be secured in the body for selectively cutting up a tire mounted on a wheel of a vehicle. A tire bead deflector is mounted on a flange of a wheel from which an old tire is to be removed after its beads have been broken, or to which a new tire is to be mounted, and the old tire to be removed or the new tire to be mounted is lowered into contact with the driving elements in the apparatus to enable the driving elements to rotate the old or new tire to either remove the old tire from or mount the new tire on the wheel. The apparatus may be made mobile by adding wheels thereto.

26 Claims, 7 Drawing Sheets

TIRE CHANGING APPARATUS AND METHOD

BACKGROUND OF THE INVENTION

1. Field of the Invention

This invention relates generally to the mounting and dismounting of tires on a rim, and, more particularly, to an apparatus and method of mounting and dismounting tires on a wheel while the wheel remains attached to a vehicle. This invention also incorporates a method for cutting a tire into more than one part without removing it from a vehicle.

2. Description of Related Art

Tire changers or mounting apparatus are well known. These apparatus normally include a table or supporting surface on which a wheel, with or without a tire, is positioned and clamped, or otherwise secured in place. The wheel is then rotated via a supporting table, by some type of device, such as an electric motor, or the like, in the apparatus. During rotation of the table/wheel, a corresponding stationary tire bead deflecting device is positioned juxtaposed to the rotating wheel, and the tire to be mounted onto or dismounted from the wheel. A great deal of mechanical design and development of these tire machines is attributable to bringing the bead deflecting device into position next to the turning wheel, without actually contacting the wheel itself, to avoid damaging the wheel. This method also requires a large swing arm, which must be strong enough to support the bead-deflecting device during the installation and removal of tires. The swing arm enables the bead-deflecting device to be swung into and out of its working position.

Furthermore, the known method of tire mounting and dismounting also requires a separate bead breaking process step even before a wheel is placed on the rotatable table for the final mounting or dismounting process described above. The breaking of the seal of the tire beads from the flanges of the wheel is accomplished via a shovel plate, which is forced against a side of the tire, while the wheel/tire is held against the side of the tire machine, or other flat surface. Examples of such known tire mounting devices are shown in U.S. Pat. Nos. 3,791,434 to Duquesne, 4,230,170 to Duquesne, 4,606,393 to Cuccolini, 4,896,712 to du Quesne, 4,986,328 to Metzger, and 5,836,368 to Corghi. Both sides of the tire have to have the seals between the tire bead and wheel flange broken. The wheel and tire are then placed on the rotatable table and the process continued, as described above. This is a time consuming process, and an attempt to speed up this process by combining the bead breaking step and tire table rotation process together is disclosed in U.S. Pat. No. 4,986,328 to Metzger. The problem with this technique is that the amount of force needed to break the seal between a tire bead and the wheel flange is often in excess of 2000 lbs. per square inch. The clamping device used to hold the wheel onto the rotatable table is not sufficient for such loads. If the tire is not able to be gently turned, and the seals between the tire beads and wheel flange broken via the disclosed bead-breaking clamps, this system begins to fail because the turntable wheel clamps will not be able to hold the wheel to the table when heavier loads are applied.

All of the known prior art devices in the field of mounting tires on and dismounting tires from wheels require that the wheels be taken off a vehicle, or from storage, and brought to the apparatus. The present invention, which mounts or dismounts a tire while the wheel remains on the vehicle, saves more than half the time, when compared to known methods and apparatus.

Today, the largest area of liability for companies that provide tire installation service is attributed to the unbolting and bolting of wheels to a vehicle. Problems that can arise out of this part of the process are numerous and expensive. For example, a striped lock nut might require jack hammering the lock nut off of a stud that holds the wheel. New studs sometimes have to be replaced before the vehicle can be safely driven again. Bolting the lug nuts back onto the vehicle correctly without over tightening (and causing stripping of the stud), or under tightening (and having the wheel fall off the vehicle while on the road). Many tools are made and sold specifically for the purpose of correctly accomplishing this task of removing and installing a wheel to a vehicle. A common tool for this process is an air impact gun, which generates loud noises. Such air impact guns must meet local code requirements, as to the time of use and type of sound deadening materials used in building in which they can be operated.

Furthermore, tires are expensive to dispose of, and are considered hazardous material due to their shape and volume. Therefore, it is expensive to dispose of whole tires.

At the present time, most old tires are recycled in a process that mulches the tires into tiny bits of rubber. One example of such a process is disclosed in U.S. Pat. No. 5,285,707 to Lodovico. This process produces a "crumb rubber", which is mixed with asphalt for roadways. Also, old tires are being used as fuel in furnaces at cement factories and to generate electricity. However, these uses have not lowered the cost of disposing of old junk tires by tire businesses because: 1. the supply of old tires has always out paced demand for their use; and, 2. The shape and volume of tires cause them to be difficult to handle, store and ship.

U.S. Pat. Nos. 4,012,973 to Tupper, 4,250,940 to Curry, 4,306,607 to Curry, 4,805,507 to Schmidt, 5,133,236 to Dudley and 5,235,888 to Dom all disclose inventions that hold and cut up old tires to change their shape and make the tire non-hazardous, easy to ship, and still useful to the businesses trying to recycle the rubber by-products. However, these machines are expensive to buy, require a lot of space in a tire store and require a further process which tire stores do not have the space and time to perform.

Therefore, there exists a need in the art for a machine that can mount and dismount tires onto wheels without the need for raking the wheels off the vehicle. And, further still there exists a need in the art for a machine which can cut old tires while they are being removed from a wheel, to change their shape and volume to make them easy to handle and less costly to dispose of.

SUMMARY OF THE INVENTION

Accordingly, it is a general object of the present invention to provide an improved tire changer apparatus. It is a particular object of the present invention to provide an improved tire changer apparatus and method for using the same. It is another particular object of the present invention to provide an improved tire changing apparatus, which may also cut tires off of a wheel, while the wheel is still attached to the vehicle, in order to provide easier disposal of the old tire. It is yet another particular object of the present invention to provide an improved tire changing apparatus, which is placed under the wheels and tires of a vehicle to use the wheels stable connection to the vehicle as a holding source, and which also uses the weight of the vehicle to aid in the cutting and changing of tires. It is yet a further particular object of the present invention to provide an improved tire changing apparatus and method, which includes a pair of rollers, a pair of bead breakers and a pair of cutting knives to mount, dismount and cut tires on wheels, while the wheels are still attached to a vehicle. And, it is yet a still further particular object of the present invention to provide an improved tire changing apparatus and method of use, which is light enough and small enough to be mobile in its use so as to be easily moved under a vehicle and to be quickly moved from one location to another.

These and other objects of the present invention are achieved by providing a tire changing device for placement under a wheel and tire assembly which is still attached to a vehicle, and which device is used to break the seals between the tire beads and flanges of the wheel. The device of the present invention may also cut the old tire being removed from the wheel into more than one part for easy disposal. And, the tire changing device of the present invention may be used to rotate a tire, which is loosely held onto a wheel, with its seal broken, in opposition to the wheel itself, which is held stationary, due to its attachment to the vehicle. A bead deflection device may be affixed to a flange of the stationary wheel to enable the tire changing device of the present invention to rotate the tire and, therefore, spin the tire off the wheel.

The novel method of the present invention includes the steps of dismounting a tire from a wheel by raising a vehicle wheel and tire assembly off the ground; positioning the device under the tire and wheel assembly; deflating the tire and lowering the deflated tire and wheel assembly onto a driving portion of the tire changing device, to place pressure against the sidewalls of the deflated tire to eliminate slippage; setting knives to contact the crown of the tire; turning the tire by the driving portion of the tire changing device; removing the cut thread portion of the tire; contacting the sidewalls of the tires in a manner to break the tires' seal to the flange of the wheel; securing a tire bead deflector to the flange of the wheel; and, turning the remaining portion of the tire sidewalls in opposition to the wheel itself, which is still attached to the vehicle, in a manner so as to deflect the tires' sidewalls over the flange of the wheel by the tire bead deflector. In some instances, the tire will not be cut, and the knife setting and cutting steps will be eliminated.

The novel method of the present invention is also used to mount a new tire onto the empty wheel, which is still fastened to the vehicle. The vehicle and wheel are raised to provide sufficient clearance; the tire bead deflector, if not already on the wheel, is secured to the wheel; the new tire is positioned onto the wheel as far as possible in proper relationship to the bead deflecting device; the vehicle is lowered so that the tire rests against a driving portion to turn the tire and deflect the first tire bead over the flange of the wheel; this step is repeated for the second bead to be deflected over the wheel flange to secure the tire loosely onto the wheel; and the tire is then inflated to seal the tire beads to the flanges of the wheel.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings, in which:

DETAILED DESCRIPTION OF THE PREFERRED EMBODIMENT

Figure 1:
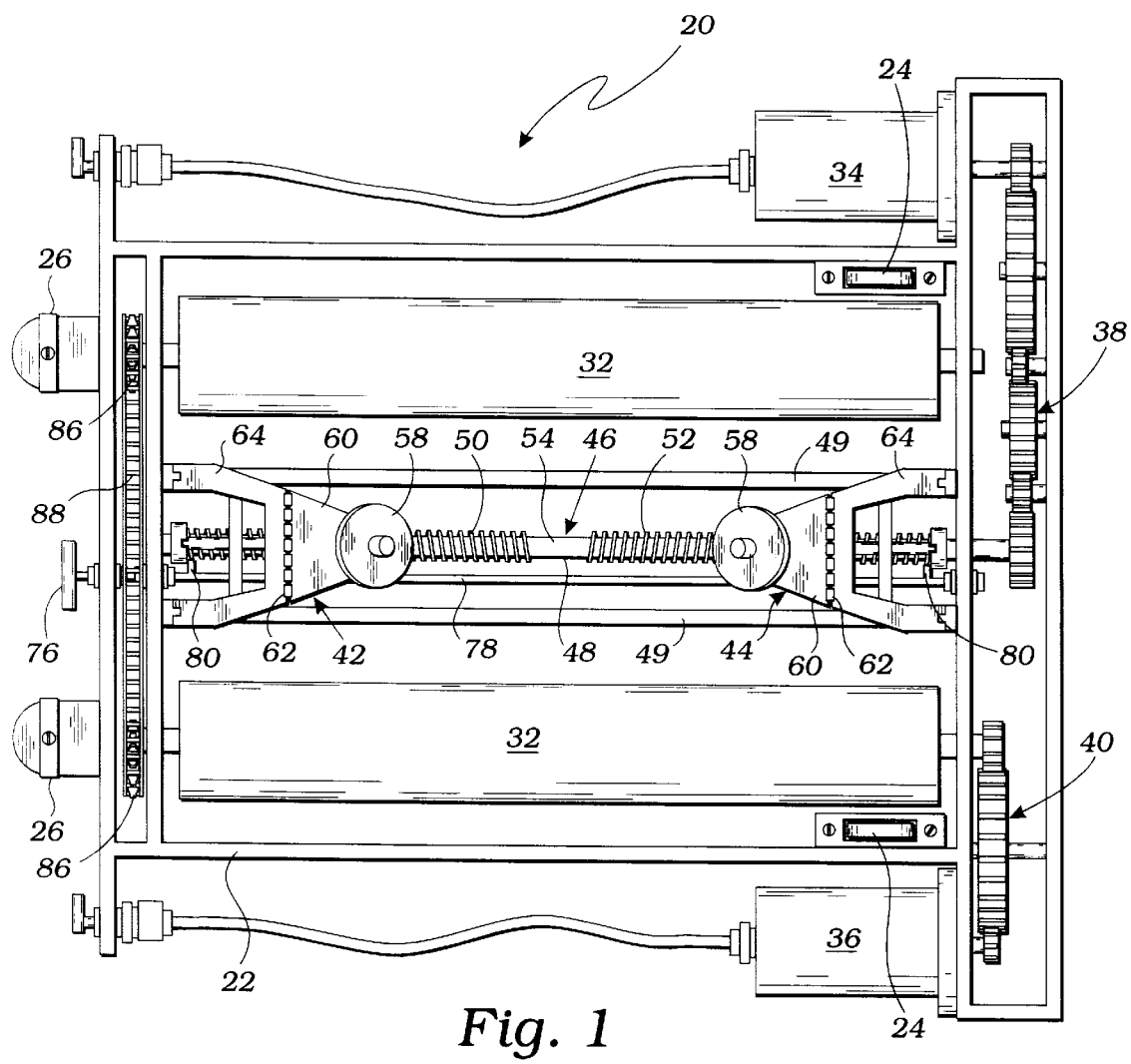
FIG. 1 is a top plan view of a mobile tire changing apparatus of the present invention.

The following description is provided to enable any person skied in the art to make and use the invention, and sets forth the best modes contemplated by the inventor of carrying out his invention. Various modifications, however, will remain readily apparent to those skilled in the art, since the generic principles of the present invention have been defined herein, specifically to provide for an improved and simplified tire changing device and method of mounting tires or dismounting tires from vehicle rims or wheels, while the wheels are still secured on a vehicle.

Turning to the drawings, one embodiment of a tire changing device of the present invention will be described, as well the novel steps of the methods used in changing tires on wheels of a vehicle, without requiring removal of the wheels from the vehicle. It is to be understood that the tire changing apparatus or device of the present invention may include different or substantially equivalent elements so long as they operate in the same manner to produce the same result. The tire changing apparatus or device of the present invention is generally indicated in the several views by the numeral 20. The apparatus 20 includes a generally open body or chassis 22. If desired, the apparatus may be supported on a plurality of casters or wheels 24, 26 to enable the apparatus to be moved into and out of position under tires and wheels mounted on vehicles, after the vehicles have been raised, as by means of a jack, or the like. The casters and wheels 24, 26 are preferably spring-loaded (see FIG. 7) so as to be capable of moving up or down when a load is applied to or removed from the apparatus 20. Additionally, the body 22 includes a plurality of feet or legs 28 on the bottom thereof, as shown in FIGS. 5–11. The feet or legs 28 may be made from any desired material, such as rubber, metal, or any other similar material that will support the apparatus 20 on the ground or a support surface 30, and prevent the apparatus from moving, when a load is applied to the apparatus, as explained more fully below. The apparatus 20 may also be made immobile and a vehicle driven onto the apparatus.

The body 22 also includes means for driving or rotating a tire and/or wheel 32, such as one or more rotating elements, for example, a pair of cylinders or drums rotatably held in the body 22. The drums 32 may be rotated by any known means, such as an electric, hydraulic or pneumatic operated motor 36 through means for rotating the same 40, such as a gear train, transmission or the like. For example, both drums 32 are shown operated by the motor 36, through gears 40, sprockets 86 and drive chain 88. This connection allows the drums 32 to be turned in the same direction at the same speed.

Figure 2:
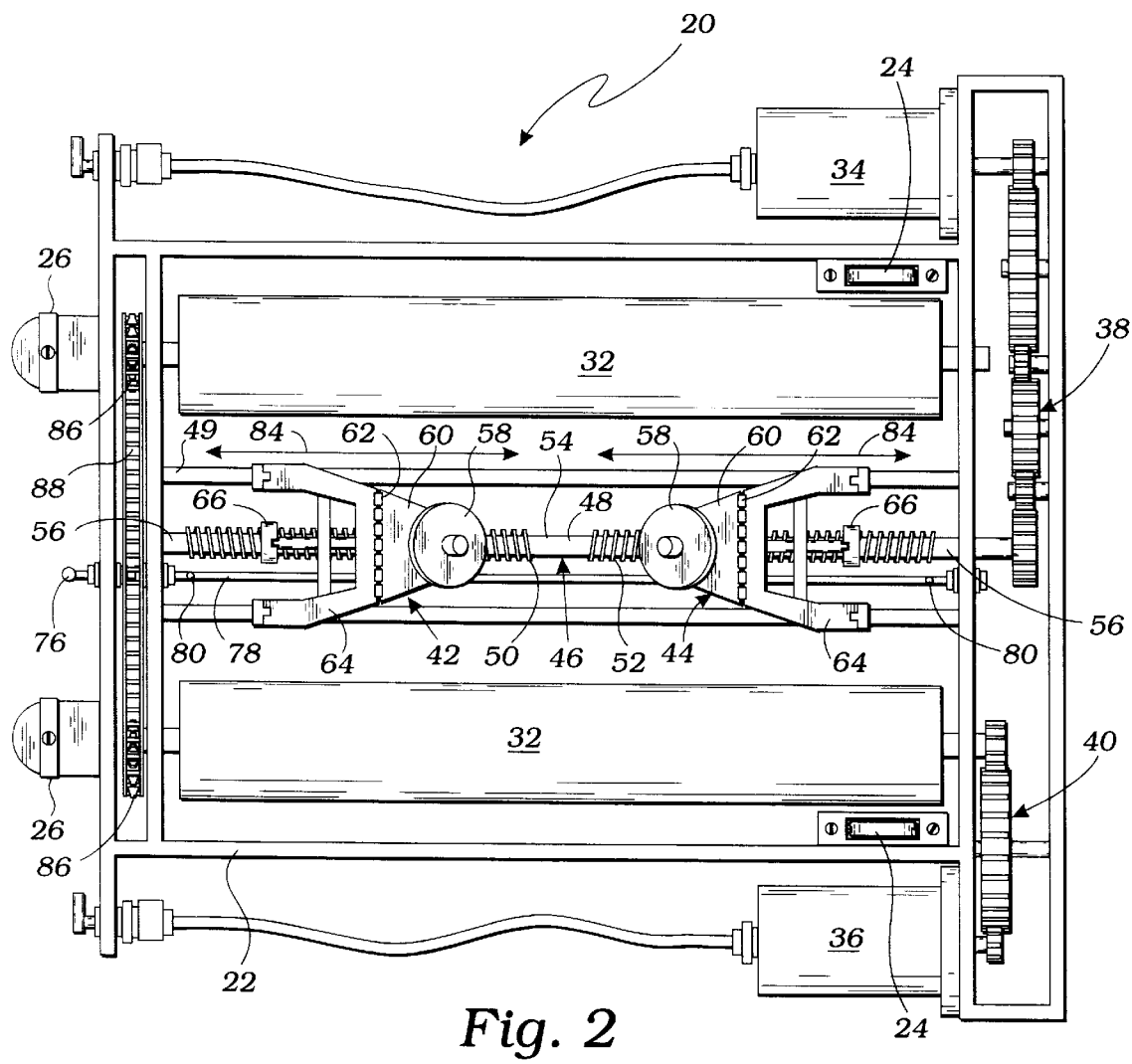
FIG. 2 is a further top plan view of FIG. 1, with bead breaking and cutting elements of the tire changer shown moveable between extended and retracted positions.
Figure 3:
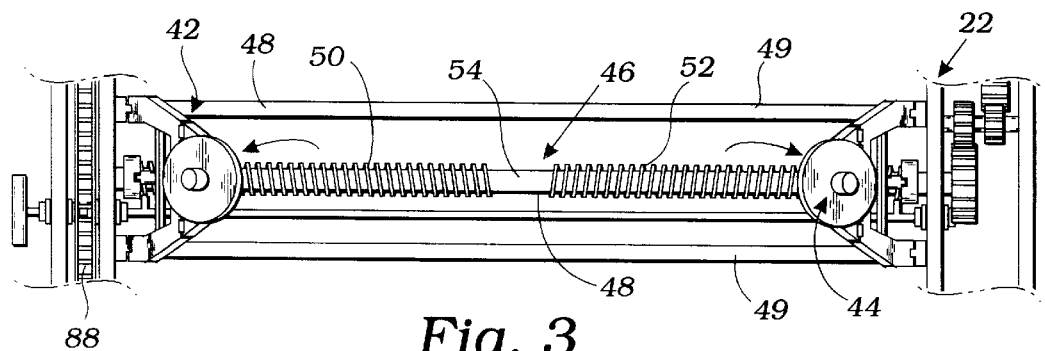
FIG. 3 is a partial top plan view showing the bead breaking and cutting elements in a fully retracted and elevated position.
Figure 4:
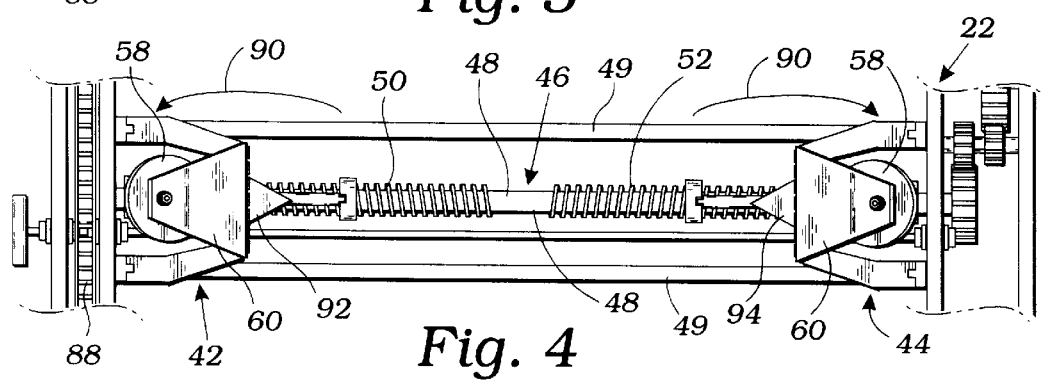
FIG. 4 is a partial top plan view, similar to FIG. 3, with the bead breaking portions of the elements rotated out of position to show knife blades in position to be operated to cut tires.
Figure 5:
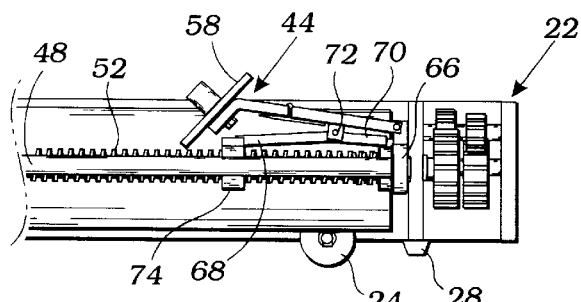
FIG. 5 is a partial side elevational view showing the bead breaking element in a fully retracted and lowered position.
Figures 6, 7:
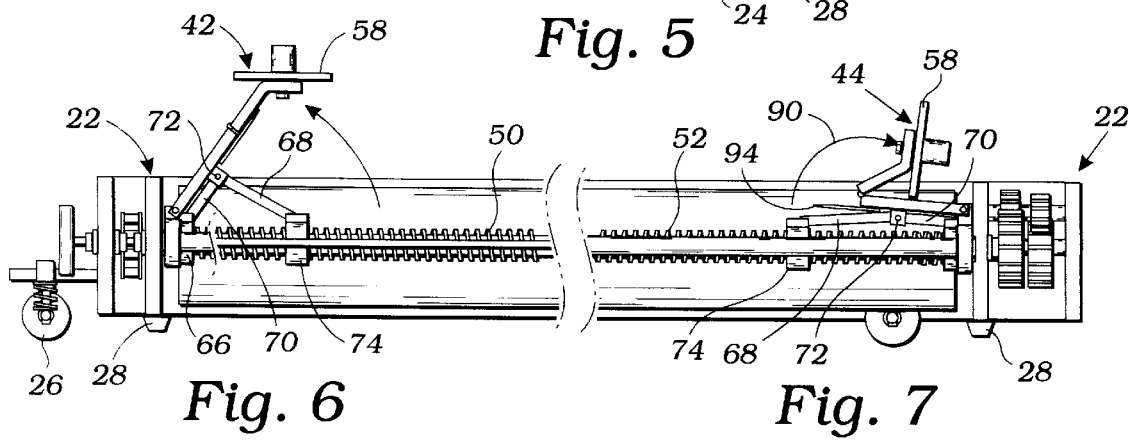
FIG. 6 is a partial cross-sectional view showing one of the bead breaking and cutting elements in a retracted and raised position.
FIG. 7 is a partial cross-sectional view showing a second of the bead breaking and cutting elements in a fully retracted and rotated position to show a knife blade in a position to cut a tire.

Centrally disposed in body 22, between the rotatable drums 32, are operating elements 42, 44, which may take any desired configuration. For example, as shown, they may be combination tire bead breakers/knife elements. Various means may be used to operate the elements 42, 44 between extended and retracted positions, as explained more fully below, to cut and/or dismount tires from wheels held on vehicles. This means for operating 46 may take any known or desired form, including electrical, hydraulic, pneumatic, or the like, elements. For example, the means for operating 46 may include an elongated shaft 48, similar to a jackscrew, having reverse threads 50, 52 formed on either side of an unthreaded central portion 54. Each of the outer ends of the shaft 48, as shown at 56 (FIG. 2), are also preferably unthreaded.

The operating elements 42, 44 are mounted on the shaft 48, and may include guide rails 49 on either side thereof. Each operating element includes at least a means for breaking tire beads 58 on a tire held on a wheel. These means for breaking tire beads 58 may take any desired shape, such as hat-shaped circular portions secured to supporting elements 60, in any known manner, as by welding, or having securing elements passing therethrough. The means for breaking tire beads 58 are preferably secured to the elements 60 at an angle calculated to distribute the force applied to a tire sidewall held on a wheel in such a manner that most of the force is applied against the sidewall, but a portion of the force will be distributed downwardly, toward the apparatus 20. The supporting elements 60 are preferably rotatably secured, as by means of hinges or the like 62, to means for operating 64, which may take any desired form or shape, but which are shown for reasons of explanation only, as being substantially U-shaped arms, rotatably secured at the ends thereof, away from the hinge 62, to guide elements, carried by rails 49.

As best shown in FIGS. 2–11, the operating elements 42, 44 are movable along the shaft 48 and rails 49, and are secured on lower sides thereof, at a connecting point 72, to one end of a pair of pivotable arms 68, 70. The other end of each of the arms 68, 70 is pivotably connected to exterior surfaces of internally threaded nuts 66 and 74 held on the shaft 48. Each of the internally threaded nuts 66 is selectively engageable with the threads 50, 52 upon turning of a handle or release knob 76, connected to a linkage or bar 78 having a pair of fingers 80 thereon. The fingers 80, when in the position shown in FIG. 1, cooperate with a side edge of the threaded nuts 66 to keep the threaded nuts 66 on the unthreaded end portion 56 and off the threads 50, 52. By turning the release knob 76, the bar 78 will be turned so as to move the fingers 80 out of contact with the nuts 66 (see FIG. 2), to allow the nuts 66 to be moved by a biasing means, such as a spring, or the like (not shown) to cooperate with the threads 50, 52. This cooperation of the nuts 66 with the threads 50, 52 allows the operating elements 42, 44 to be moved in the direction of arrows 84 (FIG. 2), either toward or away from a tire held on the apparatus 20, between the operating elements 42, 44. The operating elements 42, 44 are moved along the shaft 48 by actuation of a power means, such as a motor 34, which selectively rotates the shaft 48 in either a clockwise or counter clockwise direction through gear train 38, depending on the motion required.

As best shown in FIGS. 4, 7, 10, 11 and 13, when the connecting elements 60 and hats 58 are flipped over or rotated in the direction of arrows 90 around the hinge 62, cutting blades or knives 92, 94, if included, will be exposed on the underside of each of the operating elements 42, 44. In this position, if the shaft 48 is actuated, the knives 92, 94 will be moved in the direction of arrows 84 (FIG. 2), toward or away from a tire held in the apparatus. This rotation of the connecting elements 60 and hat 58 and movement of the cutting blades 92, 94 is further illustrated in FIGS. 10 and 11. It should be noted that before the operating elements 42, 44 are moved along the shaft 48, they may be raised or lowered by movement of nuts 74 along shaft 48, upon actuation the motor 34, with the handle 76 turned to its position shown in FIG. 1, and the fingers 80 stopping the movement of the threaded nuts 66. That is, in this position, only the threaded nuts 74 will be moved along the threaded portions of shaft 48, when motor 34 is operated, so as to raise or lower the operating elements 42, 44.

Figure 12:
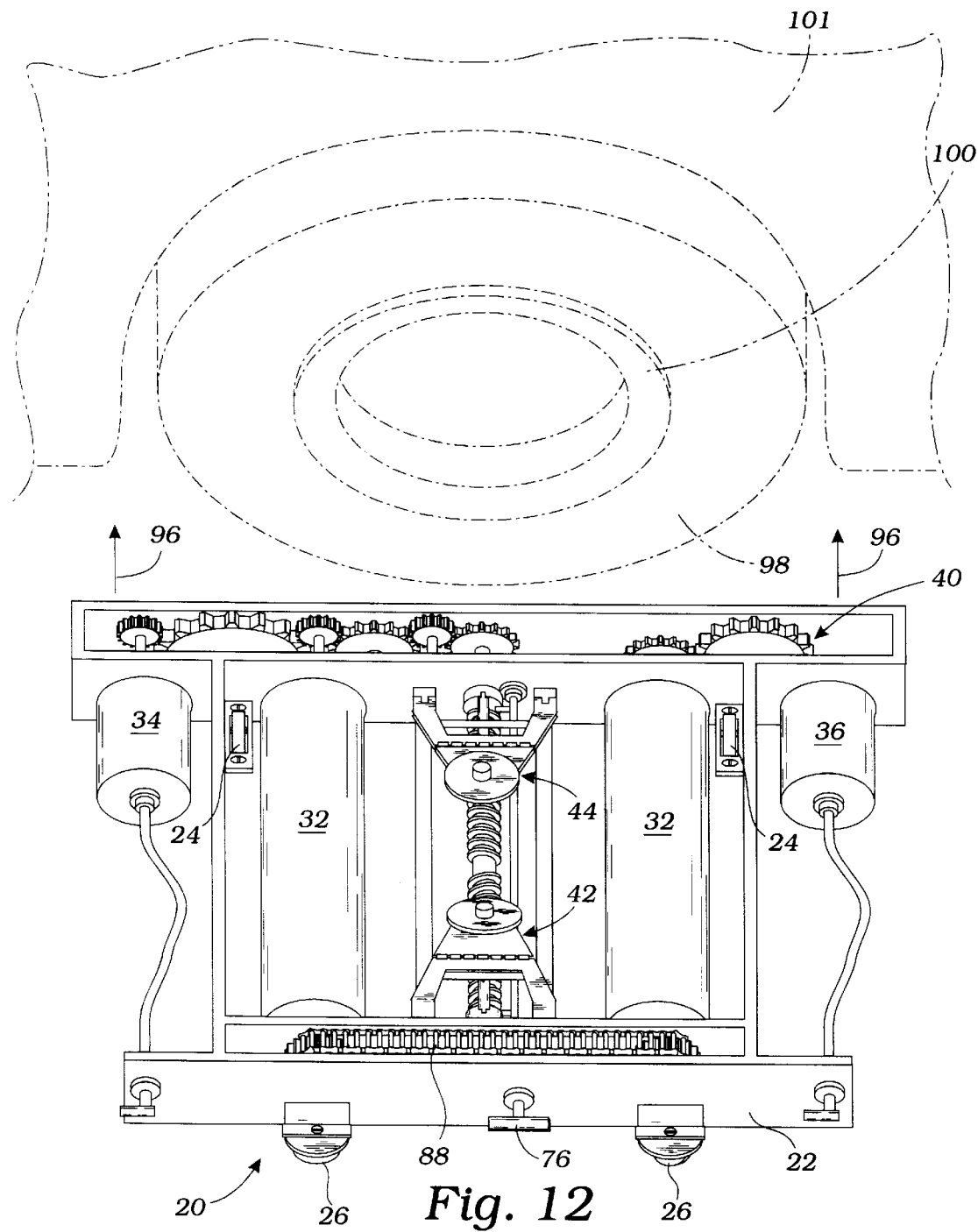
FIG. 12 is a perspective view, looking down at the top of the tire changing device of the present invention, after it has been moved into position under a tire and a wheel held on a vehicle.
Figure 13:
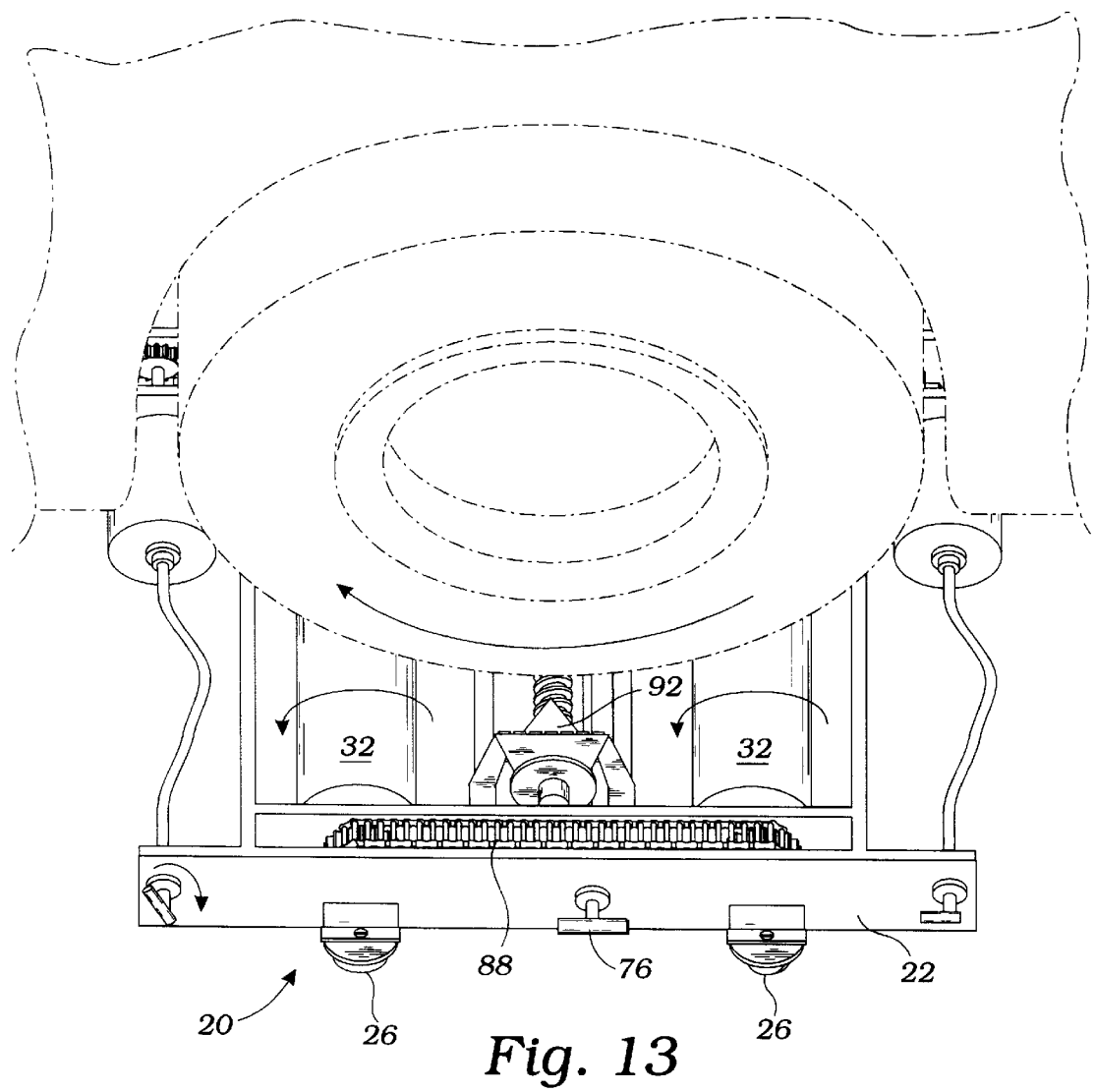
FIG. 13 is a further perspective view similar to FIG. 12, showing the tire and wheel of the vehicle lowered onto and contacting the tire turning portion of the tire changing device of the present invention.

The operation of the apparatus 20 and the novel methods of the present invention will now be described. As shown in FIG. 12, the apparatus 20 may be moved in the direction of arrows 96, so as to be under a tire 98 and a wheel 100 held on a vehicle 101. Of course, the vehicle 101 may also be driven onto the apparatus 20, and the tire 98 and wheel 100 raised off the ground by jacking up the vehicle on which the wheel and tire are held. With the apparatus 20 in position under the tire 98 and wheel 100, if the vehicle has been jacked up too high, it is lowered until the tire 98 is resting on the rotatable drums 32, see FIGS. 10, 13 and 15, between the operating elements 42, 44. The tire 98 is then deflated, and, if the tire is no longer wanted, the connecting elements 62 and hats 58 are flipped over to expose the knives 92, 94. It should be noted that the vehicle 101 holding the deflated tire 98 is preferably not completely lowered onto the apparatus 20. That is, the deflated tire is only lowered onto the drums 32 sufficiently to place pressure against the sidewalls to eliminate slippage.

If the knives 92, 94 are not already at a desired height, the handle 76 is operated, and the motor 34 is actuated to set the knives (raise or lower) to a desired height (tire crown level). The handle 76 is then turned, and the motor 34 actuated to bring the knives into contact with and through the sidewalls of the deflated tire 98 (see FIG. 11). The motor 34 is then stopped and the motor 36 operated to turn the drums 32, thereby turning the tire 98 and wheel 100 (the vehicle must have its emergency brake off and its transmission in neutral, to allow the tire and wheel to turn). The speed of turning may be fixed, or regulated to produce the best results. This turning of the tire and wheel cuts the tread portion of the tire from the sidewalls at their intersection, known as the crown.

What remains when this cutting operation is completed are two sidewalls still sealed to the flanges of the wheel, which have to be unsealed or broken from the wheel flanges. The tread portion of the tire is now free to be removed and disposed of in any acceptable manner.

The cutting knives 94 and 96 are withdrawn, by reversing the motor 34, and the connecting elements 62 and hats 58 rotated back into their operating position. If it is desired to keep the tire to be removed from the wheel 100 for any reason, the cutting operation is not performed, and the user of the apparatus would proceed to the next step.

Figure 8:
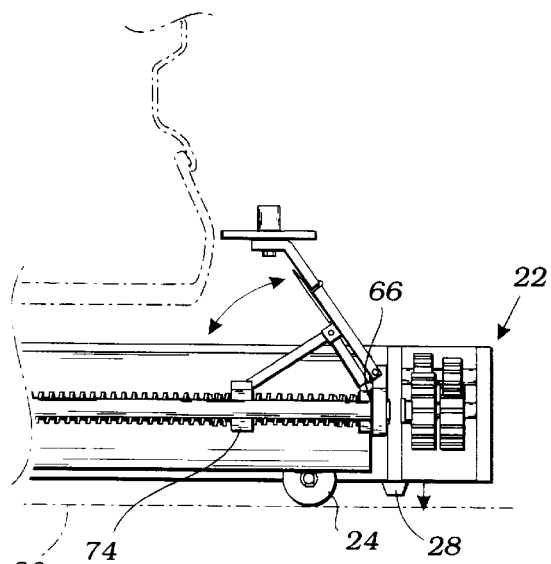
FIG. 8 is a further partial cross sectional view of one end of the tire changing device of the present invention, with the bead breaking portion of the element in a raised position where it may be brought into contact with a tire on a vehicle wheel to break the bead of the tire.
Figure 9:
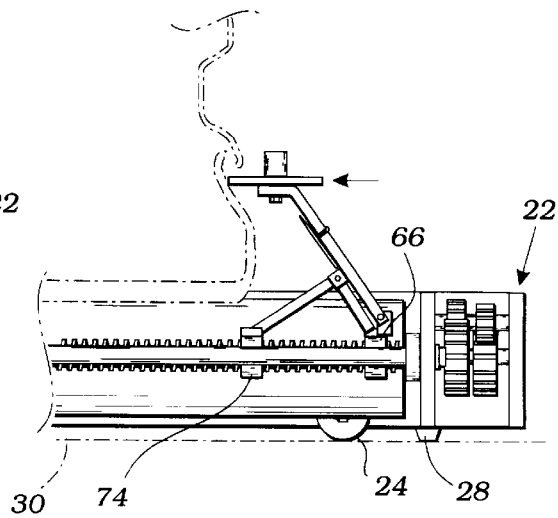
FIG. 9 is a partial cross-sectional view similar to FIG. 8 with the bead breaking portion of the element moved so that it has been brought into contact with the bead of the tire so as to break the bead.
Figure 10:
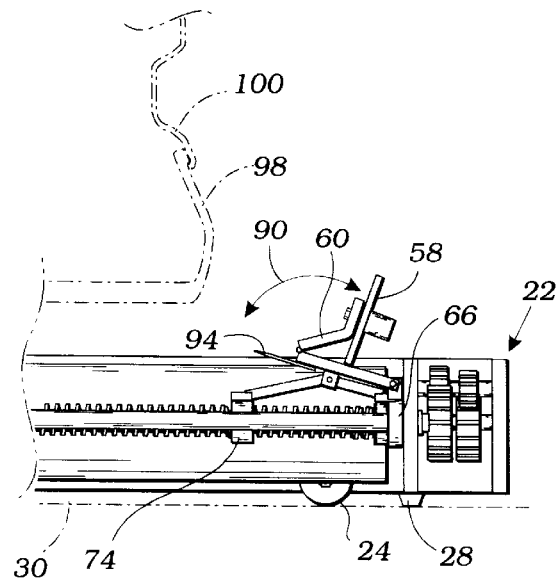
FIG. 10 is a partial cross-sectional view similar to FIG. 8, with the bead breaking portion rotated out of position to expose a knife blade.
Figure 11:
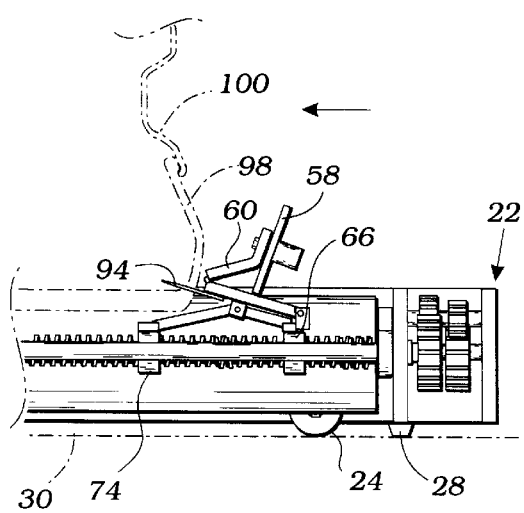
FIG. 11 is a partial cross-sectional view similar to FIG. 10 with the exposed knife blade moved so that it has been brought into contact with and through the sidewall of a tire of a vehicle whereby the tire may be turned by the device and the tire cut.

With the hats 58 in their operating position (see FIGS. 8, 9 and 12), the remaining portion of the cut tire, or the uncut tire 98 will then have its beads loosened on or broken from the wheel flange. This is accomplished by first adjusting both hats 58 to a desired height (if not already at such a height), as shown in FIG. 8, and then operating motor 34 to turn shaft 48 in the desired direction to translate the hats 58 into contact with the cut tire portion or sidewall of the tire 98 at sufficient speed and with sufficient force to break the beads from the flange on both sides of the wheel (see FIG. 9).

Figure 14:
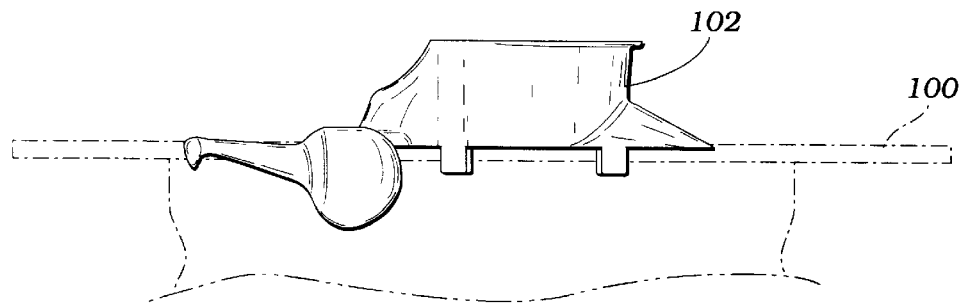
FIG. 14 is a top elevational view of one embodiment of a bead deflector that may be secured to a flange or a wheel when used to aid the tire changer of the present invention in dismounting or mounting a tire onto a wheel.
Figure 15:
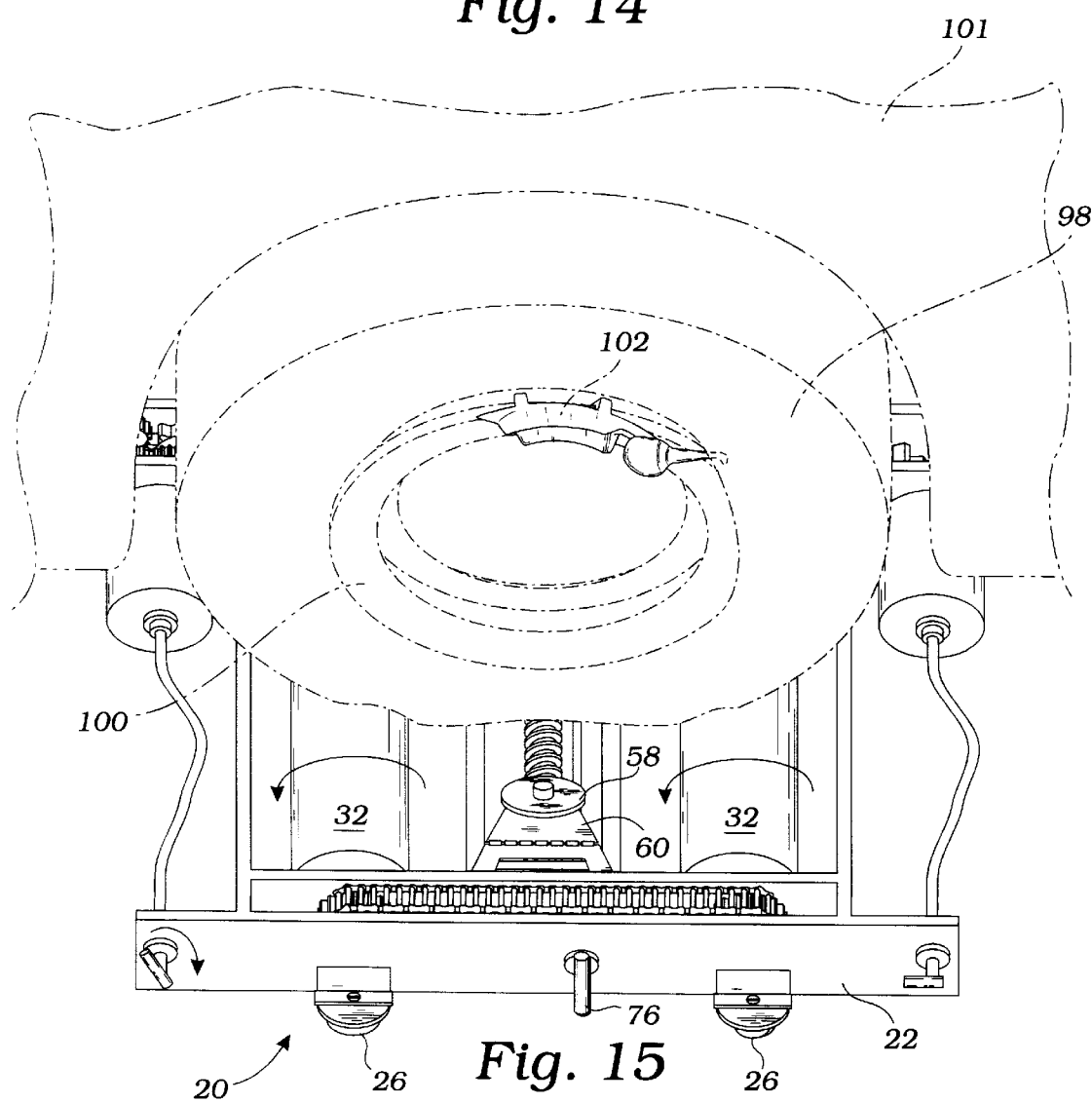
FIG. 15 is a further perspective view of a tire and wheel of a vehicle in contact with the tire rotating portion of the tire changing device of the present invention with the bead deflector secured on the flange of the wheel.

Once the beads on the remaining cut tire portion or an uncut tire have been broken from the wheel flange, the hats 58 are withdrawn or moved away (see FIG. 15). A bead deflector element 102 is then secured, as by clamping, to a flange of the wheel 100 (see FIGS. 14 and 15). The remaining cut tire portion or the uncut tire is then dismounted by ensuring that the remaining cut portion or the uncut tire is secured against the drums 32. The wheel 100 on the vehicle must be locked against turning, as by engaging the vehicle emergency brake and/or the transmission. The tire 98 is then turned on the stationary wheel 100 by rotation of the drums 32 until both sides of the tire are removed (deflected off), from the wheel by the tire bead deflector 102 clamped on the wheel flange.

If is desired to put a new tire on the empty wheel, the vehicle is raised (jacked up), the bead deflector device, if not already affixed to the wheel, is secured to the flange of the wheel and the tire is positioned onto the wheel in relation to the bead deflector as far as it will go. The vehicle is lowered until the new tire contacts the drums of the tire changing device. The wheel on the vehicle is locked from rotating by securing the emergency break or engaging the transmission, and the drums of the tire changer are rotated to rotate the tire about the stationary wheel and bead deflector device, thus enabling the first bead of the tire to be deflected over the flange onto the wheel. This is repeated for the second tire bead until the tire is mounted onto the wheel. The tire is then inflated. The mounted and inflated tire can be balanced by loosening the vehicle emergency brake, or disengaging the transmission, and using the tire changer's drums to spin the tire up to balance speed. Known devices that balance a tire while the tire and wheel assembly spin on the vehicle are then used to balance the tire.

It is to be understood that the method of mounting a tire on a wheel of the present invention may also be practiced without the aid of the apparatus 20. Although not the preferred way to accomplish the method, the deflecting device 102 may be affixed to a bead of a tire, the tire is then placed on a wheel secured on a vehicle, with the bead deflector juxtaposed between the wheel and tire. The tire is then held or secured in place by lowering the vehicle to place the weight of the vehicle on the tire, with the tire resting on the ground (or another device) to hold the tire stable. The engine of the vehicle is then started, and the wheel turned by the engine in a normal manner. Or, some other type of device may be used to rotate the wheel while the tire is held stable, to deflect the tire onto the wheel, as described above.

It, therefore, can be seen that the apparatus and methods of the present invention allow a person to easily dismount or mount tires onto a vehicle wheel without having to remove the wheel from the vehicle. The invention may also be used to cut tires into several pieces for easier disposal.

It is to be understood that, with the vast array of tire presently available for the many types of vehicles on the road, various size apparatus would be required. Furthermore, with some size tires, instead of adjustable (raised or lowered) hats or bead breakers, bead breakers of a predetermined configuration could be used and operated by means similar to, but not identical to, the jackscrew-type operator and motor described above. Furthermore, the cutting knives could be mounted on and operated by separate devices that could be translated by equivalent means between retracted and operating positions.

Those skilled in the art will appreciate that there are adaptations and modifications of the just-described preferred embodiments that can be configured without departing from the scope and spirit of the invention. Therefore, it is to be understood, that within the scope of the intended claims, the invention may be practiced other than is specifically described herein.

What is claimed is:

1. A tire dismounting and mounting apparatus, comprising:

a body;

the body having means for rotating a tire and a tire mounted on a wheel on a vehicle; means for operating the means for rotating a tire and a tire mounted on a wheel mounted on a vehicle; means for breaking tire beads of a tire mounted on a wheel mounted on a vehicle; and means for operating the means for breaking tire beads of a tire mounted on a wheel mounted on a vehicle.

2. The tire dismounting and mounting apparatus of claim 1 wherein the means for rotating a tire and a tire mounted on a wheel mounted on a vehicle includes a pair of cylindrical members rotatably held in the body.

3. The tire dismounting and mounting apparatus of claim 2 wherein the means for breaking tire beads of a tire mounted on a wheel mounted on a vehicle are movably mounted on the means for operating the means for breaking tire beads of a tire mounted on a wheel mounted on a vehicle.

4. The tire dismounting and mounting apparatus of claim 3 wherein the means for operating the means for breaking tire beads of a tire mounted on a wheel mounted on a vehicle is a rotatable element held in the body, and the rotatable element is operated by a motor held in the body.

5. The tire dismounting and mounting apparatus of claim 4, further including means for cutting a tire mounted on a wheel mounted on a vehicle into pieces.

6. The tire dismounting and mounting apparatus of claim 5 wherein the rotatable element includes reverse threads at opposed ends thereof, and the means for breaking tire beads of a tire mounted on wheel mounted on a vehicle is comprised of a pair of hat shaped elements secured to operating elements mounted on the reverse threads on the rotatable element.

7. The tire dismounting and mounting apparatus of claim 6 wherein the means for cutting a tire mounted on a wheel mounted on a vehicle are knives and the knives are also mounted on the operating elements mounted on the rotatable element.

8. The tire dismounting and mounting apparatus of claim 7, further including a means for deflecting tire beads of a tire over a flange of a wheel mounted on a vehicle, when a tire is placed in the body and secured against the pair of cylindrical members.

9. The tire dismounting and mounting apparatus of claim 1 wherein the means for rotating a tire and a tire mounted on a wheel mounted on a vehicle includes a pair of cylindrical members rotatably held in the body.

10. The tire dismounting and mounting apparatus of claim 9 wherein the means for breaking tire beads of a tire mounted on a wheel mounted on a vehicle are movably mounted on the means for operating the means for breaking tire beads of a tire mounted on a wheel mounted on a vehicle.

11. The tire dismounting and mounting apparatus of claim 10 wherein the means for operating the means for breaking tire beads of a tire mounted on a wheel mounted on a vehicle is a rotatable element held in the body, and the rotatable element is operated by a motor held in the body.

12. The tire dismounting and mounting apparatus of claim 11 wherein the rotatable element includes reverse threads at opposed ends thereof, and the means for breaking tire beads of a tire mounted on a wheel mounted on a vehicle is comprised of a pair of mechanical elements secured to operating elements mounted on the reverse threads on the rotatable element.

13. The tire dismounting and mounting apparatus of claim 1, further including means for cutting a tire mounted on a wheel mounted on a vehicle into pieces, held on the body.

14. The tire dismounting and mounting apparatus of claim 13, further including a plurality of rolling elements on the body to allow the body to be moved around on a surface, and wherein the means for cutting a tire mounted on a wheel mounted on a vehicle into pieces are mounted on the operating elements at the opposed ends of the rotatable element.

15. A method of dismounting a tire from a wheel held on a vehicle, comprising the steps of:

positioning a tire changing apparatus under a tire mounted on a wheel mounted on a vehicle;

lowering the vehicle until the tire contacts the tire changing apparatus;

breaking tire beads securing the tire to the wheel;

securing a tire bead deflector juxtaposed to the wheel and the tire; and rotating the tire and the wheel in opposition to each other and in relation to the tire bead deflector to remove the tire from the wheel.

16. The method of dismounting a tire from a wheel held on a vehicle of claim 15, including the further step of cutting the tire into a number of sections.

17. The method of dismounting a tire from a wheel held on a vehicle of claim 16, including the further step of deflating the tire.

18. The method of dismounting a tire from a wheel held on a vehicle of claim 16, including the further step of operating a motor to move bead deflectors held in the tire changing apparatus to break the tire beads.

19. The method of dismounting a tire from a wheel held on a vehicle of claim 18, including the further step of operating a motor to move cutting knives held in the tire changing apparatus to cut the tire into a number of sections.

20. A method of mounting a tire on a wheel held on a vehicle, comprising the steps of:

positioning a tire changing apparatus under a wheel held on a vehicle;

placing a tire bead deflector juxtaposed to a tire to be mounted on and the wheel held on the vehicle;

lowering the tire and the wheel onto the tire changing apparatus; and rotating the wheel and tire in opposition to each other and in relation to the tire bead deflector to mount the tire onto the wheel.

21. The method of mounting a tire on a wheel held on a vehicle of claim 20, including the further step of securing the bead deflector to a flange on the wheel.

22. The method of mounting a tire on a wheel held on a vehicle of claim 20, including the further step of rotating the wheel and tire in opposition to each other and in relation to the tire bead deflector by rotating a pair of drums in the tire changing apparatus.

23. A method of cutting a tire into more than one piece comprising the steps of:

positioning a tire changing apparatus having means for cutting tires therein under a tire mounted on a wheel held on a vehicle;

lowering the tire mounted on a wheel onto the tire changing apparatus between the means for cutting tires;

removing the means for cutting tires into contact with and through sidewalls of the tire; and rotating the tire mounted on a wheel in the tire changing apparatus to cut the tire by the means for cutting tires.

24. The method of cutting a tire into more than one piece of claim 23, including the further step of deflating the tire before lowering the vehicle.

25. The method of cutting a tire into more than one piece of claim 24, including the further steps of providing knives to cut the tire and operating a motor to move the knives into contact with and through the sidewalls.

26. The method of cutting a tire into more than one piece of claim 24, including the further step of operating a motor to rotate the tire mounted on a wheel in the tire changing apparatus to cut the tire into a number of sections.

* * * * *